July 18, 1944.   F. M. OWNER   2,354,047
SUPERCHARGED INTERNAL COMBUSTION ENGINE
Filed Jan. 18, 1943   4 Sheets-Sheet 1
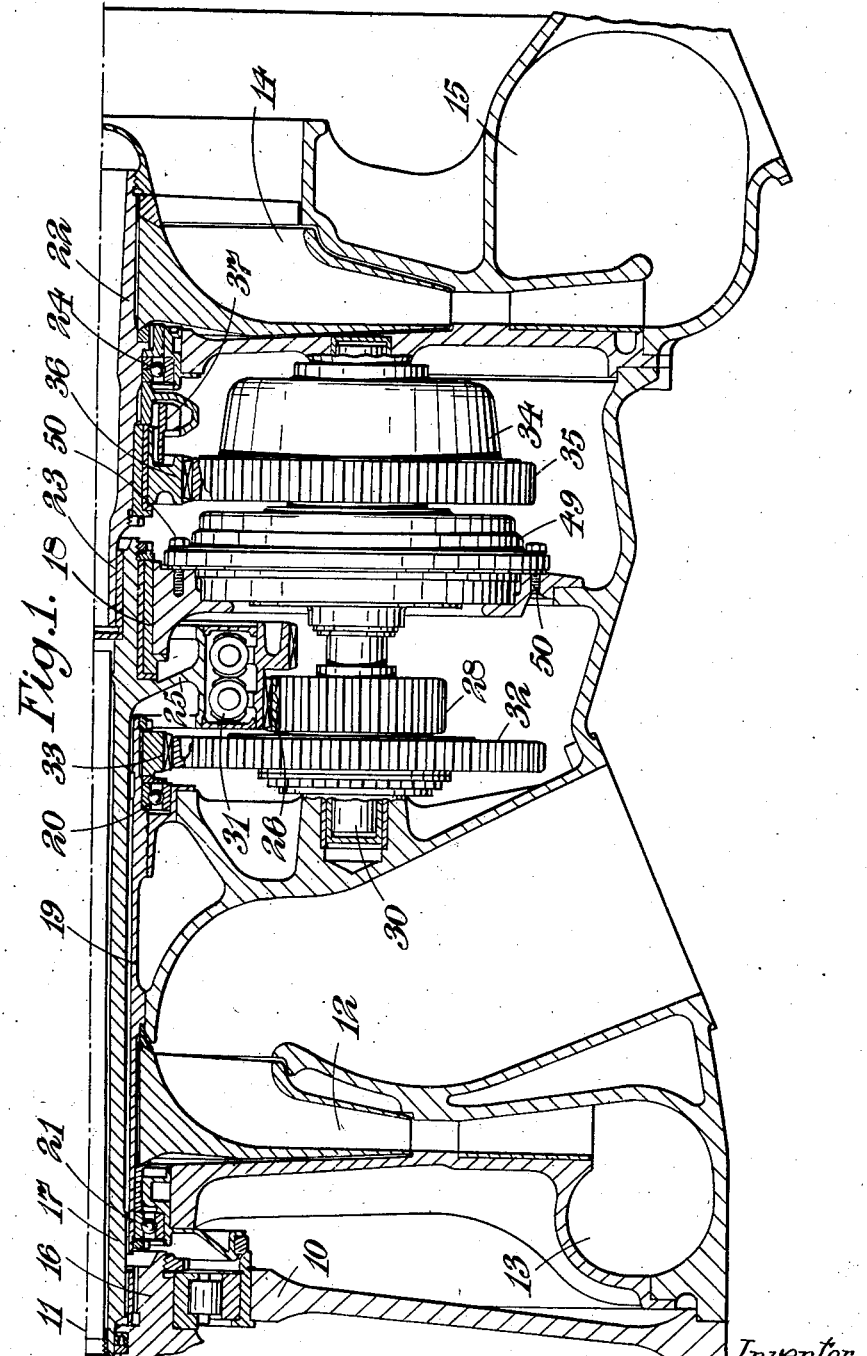
Inventor
Frank M. Owner
by Wilkinson & Mawhinney
Attorneys

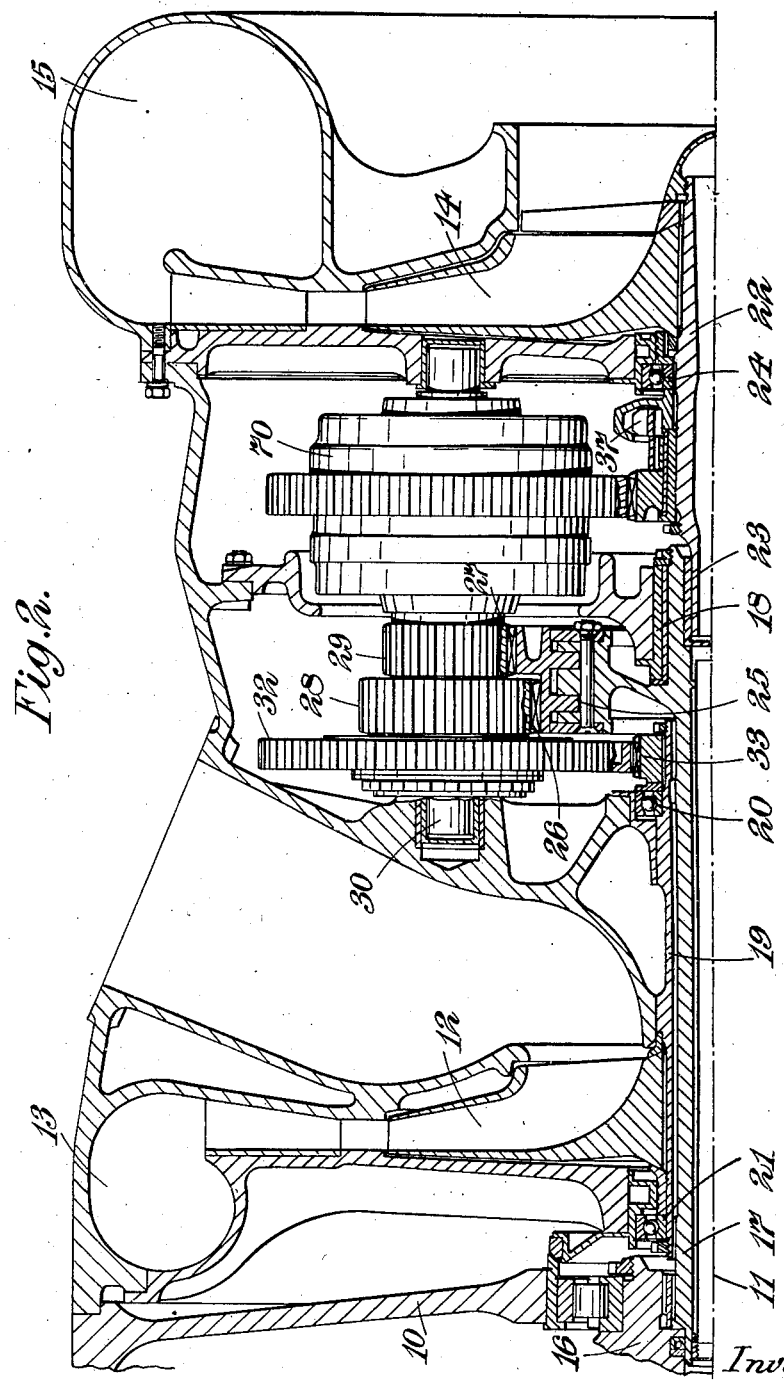

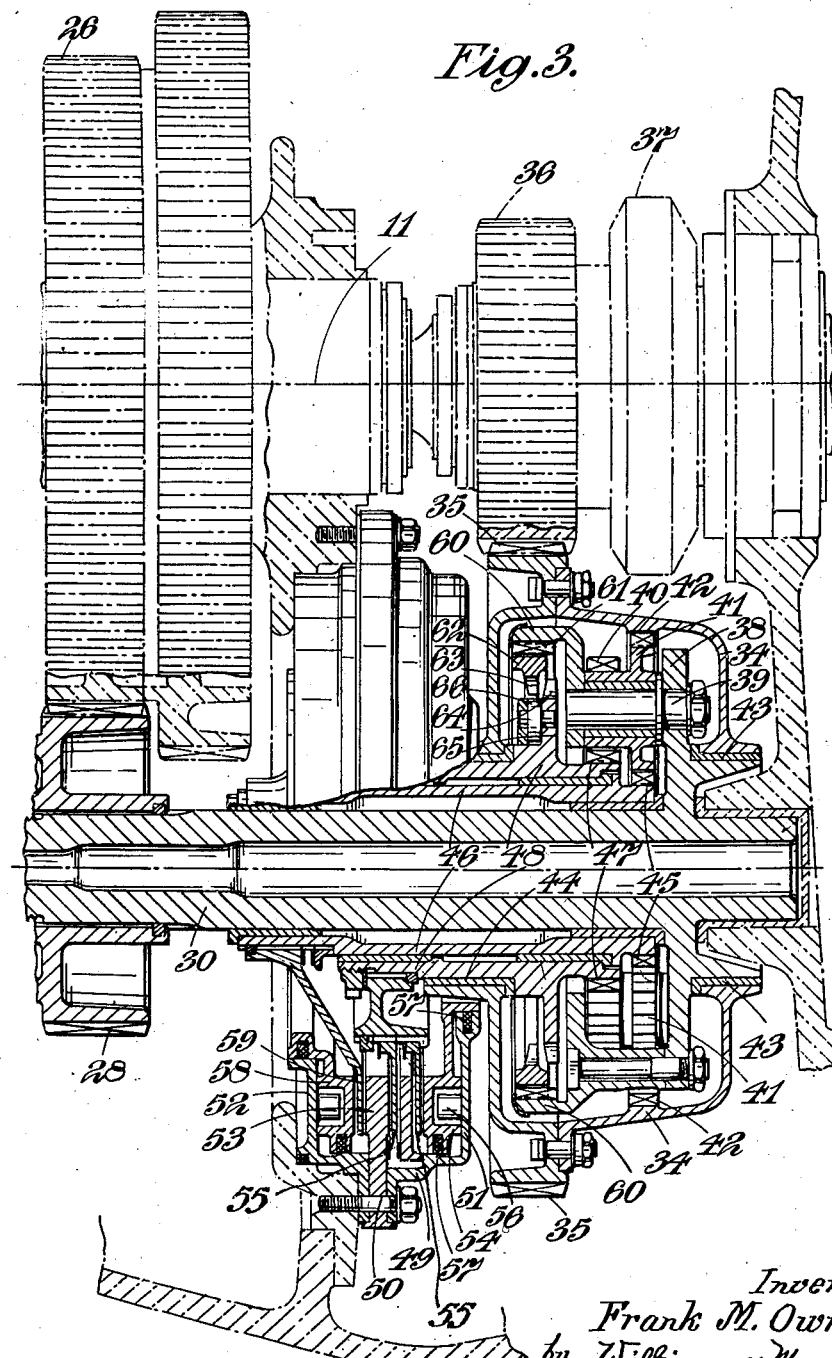

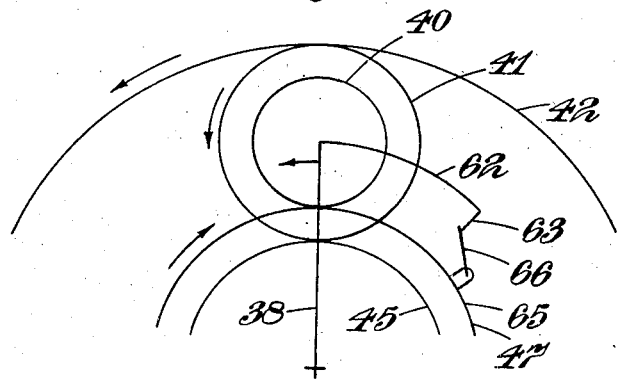
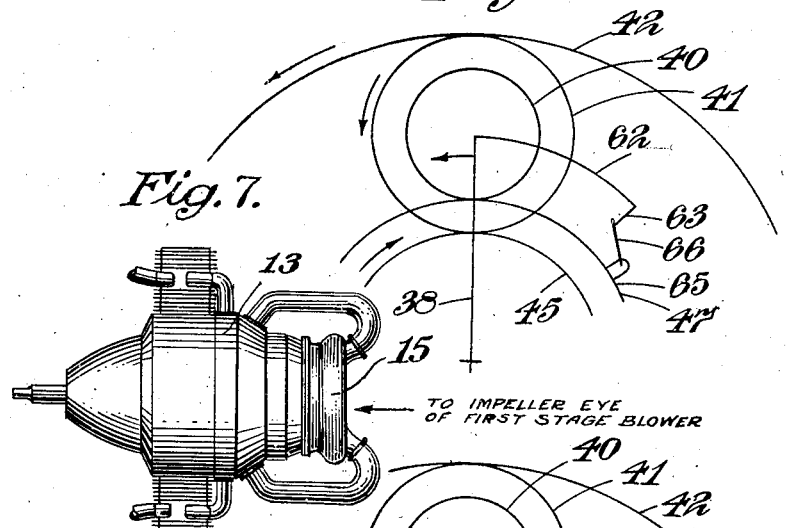
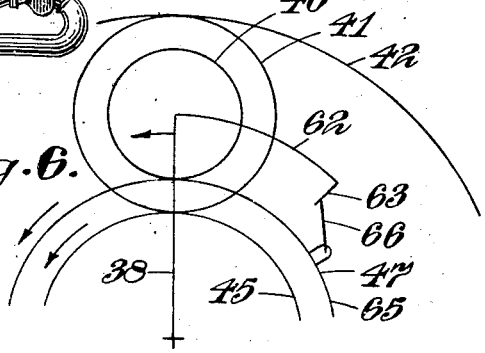

Patented July 18, 1944

2,354,047

UNITED STATES PATENT OFFICE 2,354,047

SUPERCHARGED INTERNAL-COMBUSTION ENGINE

Frank Morgan Owner, Bristol, England, assignor to The Bristol Aeroplane Company Limited, Bristol, England, a company of Great Britain Application January 18, 1943, Serial No. 472,767
In Great Britain December 2, 1941

5 Claims. (Cl. 123—119)

This invention concerns improvements in or relating to supercharged internal-combustion engines for aircraft of the kind comprising two supercharging compressors, the first compressor discharging into the second and the second into the engine-cylinders.

According to the present invention, a supercharged internal-combustion engine comprises a first and a second supercharger both of which are continuously driven, one being driven through a multi-speed gear. The first supercharger is preferably selectively driven through one of a plurality of gear-trains of different gear-ratios and the second supercharger is driven through a constant-ratio gear-train.

Internal-combustion engines of the kind with which the present invention is concerned are open to the objection that when the desired pressure of supercharge can be obtained by operating only the second supercharger, either the gas (which may be either air or the combustible mixture) to be supercharged is drawn through the first supercharger with consequent loss in efficiency, or ducts having valves to by-pass the first supercharger and lead the medium direct to the second supercharger are provided with consequent increase in weight.

According to another feature of the present invention when the second supercharger alone is capable of producing the desired pressure of supercharge, the first supercharger is driven at such a speed as to make up the pressure-loss to which the gas is subjected in its passage through said first supercharger.

This invention also comprises the improved construction of three-speed epicyclic gear hereinafter described, and the arrangement whereby the low-speed gear automatically becomes operative when both higher speeds are inoperative.

In the accompanying drawings:

Figure 1 is a half view in central section of an arrangement of two superchargers according to the present invention, with a three-speed gear for driving one of them, Figure 2 is a similar view of a construction using a two-speed gear for driving one of the superchargers, Figure 3 is a sectional view showing the construction of the three-speed gear of Figure 1, Figures 4, 5 and 6 are explanatory diagrams, and Figure 7 is a view showing the connection of the supercharger to the engine cylinder as well as the connection from the first supercharger to the second supercharger.

Referring first to Figure 1, the two superchargers are mounted co-axially with the crankshaft of an engine whereof a part of the crankcase is indicated at 10, and the axis of the crankshaft at 11. A supercharger comprising a rotor 12 discharges by a volute chamber 13 to the engine cylinders, and this is the second supercharger aforesaid, which is always in operation being driven from the crankshaft through a constant-ratio gear-train. The other or first supercharger is constituted by a rotor 14 discharging into a volute chamber 15 which communicates by suitable passages, not shown, with the inlet to the rotor 12. This first supercharger 14 is driven through one or other of a plurality of gear-trains of different gear-ratio according to the flight-requirements.

The engine crankshaft 16 has driving engagement with a co-axial extension shaft 17 which extends through the rotor 12 of the second supercharger and terminates at a bearing 18 between the two superchargers. The shaft 19 of the second supercharger is of tubular form surrounding the shaft 17 and supported in bearings 20, 21 carried by the general casing of the two superchargers.

The rotor 14 of the first supercharger is carried on a shaft 22 co-axial with the shaft 17 which is supported by a bearing 23 thereon at one end, and is also carried by a bearing 24 on the general casing of the superchargers.

On the shaft 17 near its bearing 18 there is mounted a driving gear 25 which carries a gear 26 meshing with a gear 28 on a layshaft 30 and there are two or more of these layshafts disposed symmetrically around the axis 11. The driving gear 25 preferably has a resilient driving coupling 31 with the shaft 17, such for example, as is described in the specification of British Patent No. 293,713, in order to avoid overloading the gearing from the inertia effects when accelerating or decelerating the rotors, this coupling being indicated at 31.

The shaft 30 carries a large gear 32 which meshes with and drives a gear 33 on the shaft 19 carrying the rotor 12 of the second supercharger, so that the drive from the crankshaft is continuously transmitted to this supercharger, the gear-ratios 26, 28 and 32, 33 being so selected as to give the desired high speed to the rotor.

Each layshaft 30 also transmits a drive through a three-speed epicyclic gear mounted in a casing 34 by a gear 35 thereon to a pinion 36 on the shaft 22 of the rotor 14. Preferably the pinion 36 is not directly mounted on the shaft 22, but engages it through a centrifugal clutch device 37 as described in the British Patent No. 293,713 above mentioned or in U. S. Patent No. 1,729,509, so that when the gear-ratio of the transmission is altered, the drive is taken up gradually without shock.

The construction of the three-speed gear and its controlling means is illustrated to a larger scale in Figure 3, which shows the driving gear 26 engaging the gear 28 fast on the shaft 30. On the shaft 30, at the right-hand side in Figure 3, a radial flange or spider 38 carries a suitable number of planet-axles 39 each of which carries on a suitable bearing a double planet-wheel 40, 41, these two wheels being of different sizes; the larger wheel 41 meshes with an internal gear 42 carried by the casing 34 which is rotatable on bearings 43, 44 and as mentioned above, carries a gear 35 which transmits the drive by the gear 36 to the first supercharger.

The planet-wheels 41 all mesh with a sun-wheel 45 mounted on a shaft 46 rotatable on the shaft 30, and similarly the planet-wheels 40 mesh with a sun-wheel 47 on a shaft 48.

The control of the epicyclic transmission gear is effected by a clutch mechanism mounted in a casing 49 which is secured to the supercharger casing as at 50; the casing 49 comprises two end walls 51, 52 respectively and there is also provided an inwardly-directed wall 53 which is also secured to the clutch-casing. Between the walls 51 and 53 there is mounted a diaphragm 54 which is movable axially in the casing to grip clutch-plates 55 between it and the wall 53, to hold them stationary; the diaphragm 54 is provided with recesses engaged by pins 56 to hold it against rotation, and it is also provided with oil-seals 57 so that it can be operated by the admission of oil under a suitably high pressure to the space between it and the end wall 51 of the casing. The clutch-plates 55 are mounted on the shaft 48 which carries the sun-wheel 47 so that the latter can be held stationary or released at will.

A second diaphragm 58 is arranged similarly to control a clutch-plate 59 keyed on the shaft 46 and thereby provide a similar control for the sun-wheel 45. The usual form of spring washers may be provided between the wall 53 and each of the diaphragms to maintain the clutch surfaces free from one another when the oil pressure is released.

The sun-wheels 45 and 47 are used in co-operation with their respective planet-gears to provide the medium and high speed ratios of transmission, and the low ratio transmission is provided by the following construction. The planet-carrier 38, 39 carries an extension-piece 60 in the form of an annular rim having on its inner face helical splines 61 which are engaged by corresponding splines on the outer periphery of a ring 62. On its inner face this ring is formed with a series of inwardly-directed helical teeth 63 which are adapted to engage with a similar set of teeth 64 formed on a flange 65 on the shaft 48 which carries the high-speed sun-wheel 47. This flange 65 also has pivotally mounted on it a series of fingers 66 adapted to engage the teeth 63. The operation of this part of the mechanism will hereinafter be described with reference to the diagrams, Figures 4, 5 and 6.

The control and operation of this gear will now be described, such control being effected by means of a clutch-control-valve of any suitable form which controls the admission and release of high pressure oil to the two diaphragms 54, 58 above mentioned. Assuming that the clutch-control-valve is set to select the medium speed drive, oil is delivered under pressure to the left-hand side of the diaphragm 58, moving it to the right to engage and hold the clutch-plate 59 and thereby hold the sun-wheel 45 stationary; simultaneously, the chamber to the right of the diaphragm 54 is open to drain so that the diaphragm moves to the right and releases the clutch-plates 55 and thereby leaves the sun-wheel 47 free to rotate. The drive from the shaft 30 to the planet-carrier 38 and planet-wheel 41 causes it to roll upon the stationary sun-wheel 45 and impart a drive to the clutch-casing 34 and thence by the gears 35, 36 to the rotor 14. The sun-wheel 47 rotates idly.

If now it be desired to engage the high-speed gear, the control-valve is adjusted to admit high-pressure oil to the right-hand side of the diaphragm 54, and thereby lock the clutch-plates 55 and the sun-wheel 47. Simultaneously, the space to the left of the diaphragm 58 is open to drain, thereby releasing the clutch-plate 59 and the sun-wheel 45. The drive from the shaft 30 through the planet-carrier to the planet-wheels 40 causes them to roll on the stationary sun-wheel 47, and their motion is transmitted to the planets 41 which drive the casing 34 at a high speed, and through the gears 35, 36 drive the rotor 14 at the desired high speed.

The lowest transmission ratio is effected by releasing both of the sun-wheels 45, 47, by opening the chambers for the two diaphragms 54, 58 both to drain, so that both sets of clutch-plates are released and reference may now be made to the diagrams, Figures 4, 5 and 6. The planet-carrier 38, planets 40 and 41, sun-wheels 45 and 47 and gear 42 on the casing are all indicated diagrammatically, and Figure 4 shows the motions of the various parts by the arrows indicated thereon. Figure 4 shows the state of affairs when medium speed is engaged. The sun-wheel 45 is held against rotation, the planet-carrier 38 is rotated anti-clockwise, and causes the planet-wheel 41 to roll on it in the direction indicated, thereby imparting a drive to the gear 42, also in the direction indicated. The sun-wheel 47 rotates idly in a clockwise direction as indicated by its arrow, and its shaft and flange 65 with the pivoted fingers 66 also partake of this rotation. The ring 62 carrying the teeth 63 is carried by the planet-carrier and is therefore rotating anti-clockwise, so that the fingers 66 click idly over the teeth 63.

In Figure 5 the state of affairs is shown when the high-speed ratio is engaged; the planet-carrier is rotating anti-clockwise, the sun-wheel 47 (and with it the flange 65 and fingers 66) are held against rotation, the sun-wheel 45 rotates idly and the planet 40 rolls on the stationary sun-wheel 47, thereby imparting a drive through the planet 41 to the gear 42. In this gear setting also the teeth 63 click idly over the fingers 66 owing to their relative rotations.

Figure 6 shows the arrangement when the lowest gear ratio is used, and both of the sun-wheels 45, 47 are left free to rotate idly. Since the two sun-wheels are stationary, no drive is imparted to the rotor 14 of the first supercharger, and it therefore slows down, and if it stopped, so that the gear 42 were also stopped, it is clear that the planet 41 would roll on the gear 42 and thereby cause the planet 40 to drive the sun-wheel 47 in an anti-clockwise direction as indicated by the arrows. There is not, however, sufficient loading on the supercharger at low speeds to cause it to stop, but the speed is reduced sufficiently to cause the planet-wheels to drive the sun-wheels in an anti-clockwise direction, and therefore engage the fingers 66 with the teeth 63 and thereby tend to drive the ring 62 at a higher speed than that of the planet-carrier. Its splined engagement 61 with the planet-carrier causes it to be moved to the right (see Figure 3), so as to mesh the teeth 63 with the teeth 64 so that the sun-wheel 47 is locked to the planet-carrier and the whole gear rotates solid, giving the desired low-speed transmission to the supercharger rotor 14 sufficient to compensate for the pressure loss of the air or gas passing through it.

When the medium speed ratio is engaged, by locking the sun-wheel 45, the first engagement of the clutch members loads the planet-wheel 41, and thereby loads the interengaging helical teeth 63, 64, so that they automatically disengage, and as soon as they are disengaged, the helical splines 61 complete the lateral movement of the ring 62 into the free position shown in Figure 3. As soon as the teeth 63, 64 are disengaged, the rotation of the sun-wheel 47 is reversed, as indicated in Figure 4, so that the fingers 66 click over the teeth 63 as previously described.

It will thus be appreciated that the control of the clutches for the sun-wheels 45, 47 provides alternative drives at three different speeds for the rotor 14 of the first supercharger.

Figure 2 illustrates a modified construction of the present invention in which a two-speed gear is provided for the drive of the rotor 14 of the first supercharger, and for this purpose, a two-speed transmission assemblage described in the specification of British Letters Patent No. 465,612 is substituted for the three-speed gear.

The construction illustrated in Figure 2 is conveniently identical with that of Figure 1 in so far as the constant ratio drive to the second supercharger rotor 12 is concerned, and the only difference is that the three-speed gear in the casing 34 is replaced by a two-speed gear indicated generally by the reference 70; the drive as far as the gear 25 is similar to that illustrated in Figure 1, but the gear 25 carries two gears 26, 27 which mesh respectively with gears 28, 29. The gears 26, 27 are used in the same way as in Figure 1, but the gear 29 is additional, being used for the two-speed gear 70. In order to make the two constructions interchangeable, the double gears 26, 27 may be used in Figure 1, and are so illustrated, although the gear 27 is idle in that case.

I claim:

1. In combination, a supercharger, multi-speed transmission for driving said supercharger comprising low and higher speed gear ratio units, means to selectively shift the higher speed ratio units into and out of connection with said supercharger, and automatic means for causing low gear ratio connection to the supercharger at such times as the supercharger runs free of the higher speed ratios, said automatic means comprising two relatively rotary and axially shiftable parts, means to cause relative axial shifting of the parts when rotated relatively to one another, intermeshing members caused to enmesh and disengage on axial movement of the parts in opposite directions, and means carrying one of said members for locking the transmission to rotate as a whole and provide said low gear ratio drive.

2. In combination, a supercharger, multi-speed transmission for driving said supercharger comprising a plurality of higher speed ratio units, a low speed unit comprising two relatively rotatable and relatively axially movable parts, means between said parts for causing one of the parts to slide axially when the parts are relatively rotated, intermeshing members normally out of mesh and moved into and out of mesh by the axial sliding of said part, means connecting one of said members with the other units of the transmission to cause the transmission to be interlocked and to rotate as a whole when said members are intermeshed, and ratchet means carried by said last named means for engaging the other of said intermeshing parts.

3. In combination, a supercharger, multi-speed transmission for driving said supercharger comprising a continuously driven carrier, medium and high speed planet gears rotatably supported on said carrier, sunwheels independently mounted in connection with said planet gears, a ring gear in driving relation to said supercharger and in driven relation to said planet gears, means for selectively arresting the motion of either of said sunwheels to cause said ring gear to rotate at a selected medium or high speed, a low speed gear unit comprising means to free said low gear ratio unit when either of said medium or high speed ratios are engaged and to further automatically connect said low gear ratio to said ring gear whenever the medium and high speed ratios are disengaged.

4. In the combination of claim 3, said low gear unit comprising an annular rim affixed to said carrier and rotated therewith, a ring within said rim rotatable and axially slidable independently of said rim, helical splines between said rim and ring, a shaft connected to one of said sunwheels, normally disengaged helical teeth on said shaft and ring, and a series of fingers pivoted on said shaft and engaging the teeth of said ring.

5. In combination first and second-stage superchargers connected together in series in which the gas first passes through the first-stage supercharger and then is delivered to, and passes through, said second supercharger, engine driven means for driving said second-stage supercharger at substantially constant speed and at a minimum at which the second supercharger alone is capable of producing the desired pressure of supercharge at minimum requirements of the engine, a multi-speed transmission for driving said first-stage supercharger comprising medium and high speed gear ratio units and a low speed gear ratio unit, means for selectively engaging said medium or high speed units with said first-stage supercharger, and automatic means constructed and arranged in association with said low speed ratio unit to connect the first-stage supercharger with said low gear ratio unit whenever the higher speed ratio units are disengaged whereby at all times to cause the first-stage supercharger to be driven at such a minimum speed as to make up the pressure loss to which the gas is subjected in its passage through said first supercharger.

FRANK MORGAN OWNER.